Patented June 1, 1943

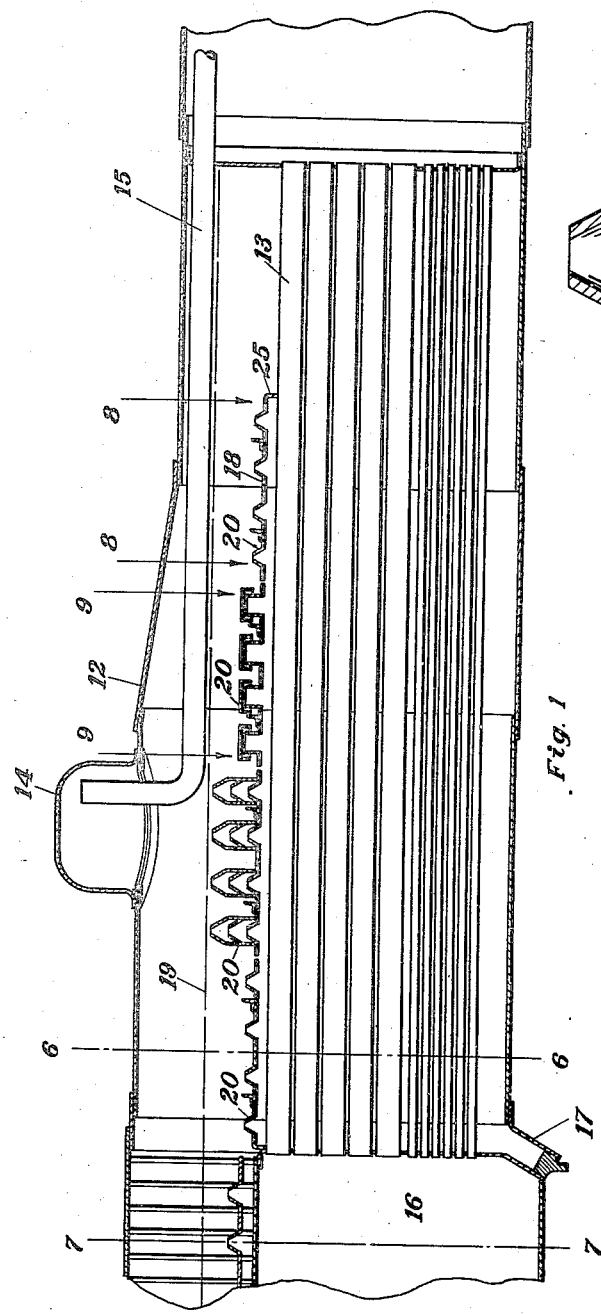

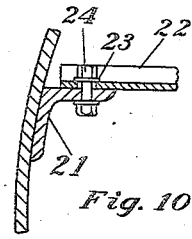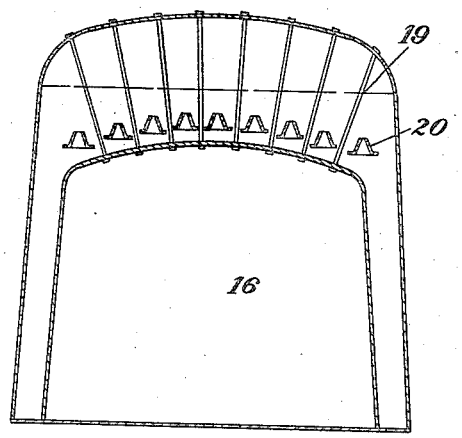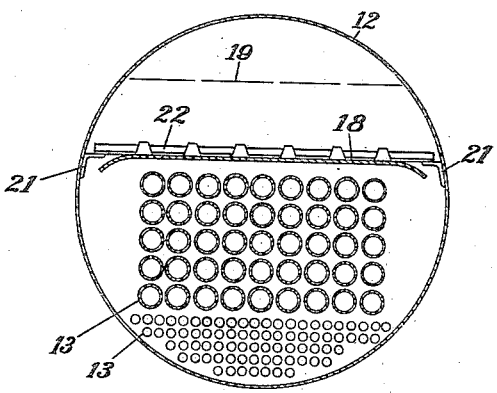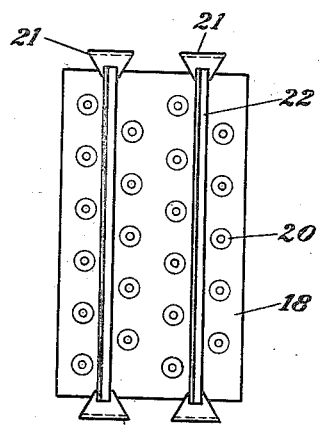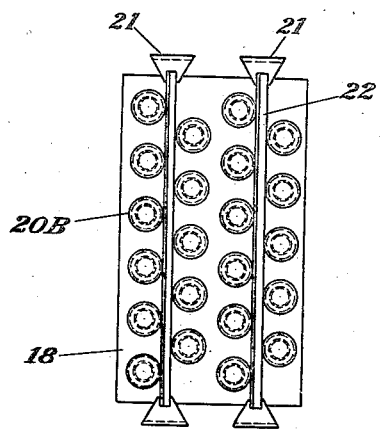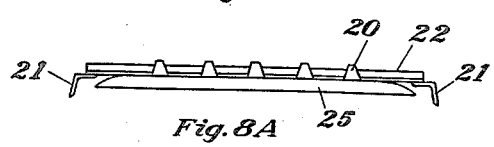

2,320,366

UNITED STATES PATENT OFFICE 2,320,366

FOAM RETARDING MEANS AND METHOD

Walter B. Leaf, Denver, Colo.

Application October 23, 1940, Serial No. 362,479

7 Claims. (Cl. 252—361)

This invention relates to foam retarding methods and means, and has particular application to retarding foam or froth formation in locomotive boilers, pressure vessels and the like.

It is well-known that pure liquids, such as water, alcohol and ether, for example, do not foam. In order to have a foam-forming condition, there must be some other material dissolved or suspended in the liquid and the concentration of the dissolved material must be of a substantial character before foaming occurs.

For example, locomotives usually do not develop foam formation until a concentration of from 150 to 175 grains of dissolved matter per gallon is reached.

When foaming occurs, the foam passes out through the steam line, and where superheated units are used, the foam may be completely evaporated by the action of the boiler. In this case, the units will become scaled by the deposit of dissolved and suspended matter carried in contact therewith by the foam. If the foam passes through them to the steam cylinders, lubricant is washed off, physical damage is done to cylinders, pistons and the like, and power is appreciably reduced. In some cases, the condition becomes so aggravated that explosions may occur.

The mechanism of foam formation where the dissolved solid concentration is sufficiently high is in the formation of a liquid layer surrounding the steam bubble which has a concentration of dissolved and suspended matter different than the average concentration in the liquid body as a whole.

When two small bubbles approach each other, they remain separated by a liquid film of abnormal concentration. In order to coalesce and form one bubble which has a different ratio of volume to surface than that possessed by the two separate bubbles, it is necessary to change the concentration of dissolved and suspended matter in the film. Such a change requires energy.

It is an object of the present invention to provide mechanical means within a liquid body subject to foam formation capable of inducing a coalescence of bubbles rising therethrough.

Another object of the invention is the provision of means for supplying the necessary energy to change the concentration of dissolved and suspended matter in the films of bubbles inducing foam formation.

A further object of the invention is the provision of a simple, durable and economic structure for retarding foam formation in boilers and the like.

Still another object of the invention is the provision of means for retarding foam formation in boilers or the like, without causing any galvanic action within the boiler.

A still further object of the invention is the provision of a novel method for reducing accumulation of foam above the body of liquid generating foam-producing bubbles to an extent sufficient to eliminate the detrimental results of bubble formation.

Other objects include novel steps and treatments and novel combinations and arrangements of parts, all of which will appear more fully in the course of the following description.

Heretofore in the art, various means of counteracting the effect of foam-formation in boilers and the like have been attempted with varying degrees of efficiency.

One method of retarding foam-formation has been to use chemical agents. For example, additions of small quantities of emulsified castor oil to the liquid in the boiler will cause a surface tension change which reduces the foam height. However, the presence of alkaline materials in the boiler liquid causes the castor oil to be saponified, necessitating that the boiler be blown out frequently.

Alcohols and other compositions which might be satisfactory in other instances for retarding foam-formation cannot be used in boilers, due to their rapid evaporation at the high temperatures to which such boilers are subjected.

Certain mechanical expedients have been devised for combating foaming influences, but without exception, these devices depend on a treatment of the foam after collection at the surface of the liquid body, rather than by retarding formation within the liquid.

The method of the present invention involves the location of mechanical means within a liquid body through which foam-forming bubbles are rising, which is capable of collecting quantities of such bubbles and subjecting them to energy-dissipating influences to induce coalescence during their ascending movement. Following this, the coalescent matter is passed directly to the surface of the liquid where it breaks down rapidly, as bubbles of relatively large superficial area do not retain their form and produce foam to an appreciable extent.

As an example, bubbles of one-quarter inch or less diameter have pronounced foam-forming properties, while bubbles of one inch diameter have little, if any, tendency to form foam. The present treatment methods are capable of collecting the smaller size bubbles rising through the liquid and converting them by the coalescent action into bubbles of one inch or greater diameter, with the result that foam-forming tendencies are substantially dissipated.

Preferably, the embodiment of the invention will include means in the liquid body for collecting a plurality of bubbles which are brought together in a coalescing action without materially retarding the ascending movement, and immediately following coalescence, permitting an uninterrupted travel to the surface.

While the invention is susceptible of embodiment in numerous structural forms, the essential features are common to the various forms, and to afford a better understanding of the invention, reference will be made to the accompanying drawings, illustrating several of such embodiments.

In the drawings,

Figure 1 is a fragmentary vertical section through a locomotive boiler to which the present invention has been applied;

Figure 2 is a vertical central section through one form of coalescing means;

Figure 3 is a vertical central section through the preferred form of coalescing means;

Figure 4 is a vertical central section through another form of coalescing means;

Figure 5 is a vertical central section through still another form of coalescing means;

Figure 6 is a section taken along the line 6—6, Figure 1;

Figure 7 is a section taken along the line 7—7, Figure 1;

Figure 8 is a fragmentary plan view looking in the direction of the arrows 8—8, Figure 1;

Figure 8a is an end view projection of the coalescing means of Figure 8;

Figure 9 is a fragmentary plan view looking in the direction of the arrows 9—9, Figure 1; and Figure 10 is a fragmentary section, drawn to an enlarged scale of the expansion joint used in fastening the coalescing means in the boiler.

Figure 1 represents the application of the present invention to a locomotive boiler 12 having a conventional arrangement of tubes 13 and provided with a dome 14 having the usual dry pipe 15. A portion 16 of the fire box of the boiler has been illustrated and also the drainage outlet 17 in the lower portion of the boiler.

The present invention is applied by locating a series of collector plates 18 above the tubes 13 and within the liquid body in the boiler, the surface of which or liquid level is indicated by the dotted line 19.

The plates 18 extend substantially across the boiler 12 and have a plurality of energy-dissipating passages or nozzles 20, the details of which will be described subsequently.

A series of plates are located in adjoining relation along the length of the boiler and preferably terminate at a substantial distance from its forward end, due to the fact that little, if any, foam-forming conditions occur in this portion of the boiler.

In Figure 1, three different forms of energy-dissipating passages 20 have been illustrated to show the application of the various structural forms in the boiler. It will be understood that in usual practice, one form of passage construction 20 will be chosen as suitable for any given boiler, and the several plates 18 will be substantial duplicates.

As illustrated in Figures 2 through 5, the nozzles 20 may assume a variety of shapes and still satisfy the functional requirements. Thus in Figure 2, the nozzle comprises two frusto-conical portions, the narrower ends of which meet to provide a continuous passage of the Venturi type.

In Figure 3, the preferred form of nozzle has been illustrated, which comprises an open-ended cone, the narrower end of which is intended to be elevated with respect to the supporting plate portion 18.

In Figure 4, the nozzle 20 comprises a cylindrical portion 20a, above which a cap portion 20b is held in spaced relation to provide a direction-changing passage 20c through which matter rising out of the portion 20a must pass.

Figure 5 embodies a series arrangement of nozzles 20 of the type illustrated in Figure 3 in which a cylindrical portion 20d terminates at its upper end in an open-ended cone 20e. The cylinder 20d seats on the base of a lower member 20, and intermediate the cone portion 20e and the lower member 20 a third cone 20f is provided.

Any of the nozzles illustrated in Figures 2 through 5 may be made of a variety of materials. Preferably, the forms illustrated in Figures 2 and 3, in particular, are made of a flexible material, such as rubber, to provide a self-cleaning action. When so constructed, scale or other matter tending to collect in the narrower end of the cone will cause a sufficient flexing of the discharge opening to permit its passage therethrough. When rubber or other flexible compositions are used, it will be understood that the nozzles 20 will be fastened at their bases to the plate member in any suitable manner, such as by riveting or the like.

When a metallic construction is to be employed, it is necessary to have the nozzles formed from the same composition that is used in the formation of the boiler plates to prevent any galvanic action being initiated in the liquid within the boiler. It will be understood that the flexible materials selected for formation of the nozzles will be materials of an organic nature, which do not set up any galvanic action.

As illustrated in Figures 8 and 9, a relatively large number of nozzles 20 are provided for each of the plates 18. It will be understood that the number and location of such nozzles may be varied at will to satisfy the requirements of any given operation.

In a boiler such as that illustrated in Figure 1, the steam generating action serves to cause the formation of many small bubbles in the liquid after the boiler has operated for sufficient time to have a substantial amount of dissolved matter in its liquid contents. These bubbles rise toward the surface, indicated by the dotted line 19, and upon reaching the plates 18, are forced to travel into one of the collecting nozzles 20 in order to proceed further under the elevating tendencies. As a consequence, a number of such bubbles will be brought together at the same time within a given nozzle 20 and due to the energy-dissipating action thereof and the restricted discharge outlet, will be brought together in a coalescing action.

Upon passing from the nozzles 20, the coalescent matter is free to pass directly to the surface where it readily breaks down.

The action within the nozzles 20 results from the character of the film on the bubbles hereinbefore described and the form of the nozzle which serves to press a plurality of the bubbles together with sufficient force to break the film between them and cause them to merge into a single larger bubble.

While I do not wish to be limited to any proportion in the size and arrangement of the nozzles, I have found in practice that a nozzle of the type illustrated in Figure 3, which is one and one-half inches in height, one and one-half inches in diameter at the bottom, and from one-fourth to five-eighths inch at the top, will give satisfactory results.

In laboratory tests, when a series of such nozzles have been used, foam from twelve to fourteen inches in height has been reduced from three and one-half to six inches height. Likewise, when devices of the type illustrated in Figure 5 have been used, the foam height has been reduced to less than one inch. In such testing, a concentration of fifteen hundred grains of dissolved solids and about thirty grains of suspended solids per gallon have been employed, and when subjected to the action of the nozzle arrangement of Figure 5, the foam height has been kept under six inches.

The arrangement described is sufficiently efficient to eliminate the need of anti-foam compounds in the boiler liquid and permits a reduction in blow-off operations. Likewise, there is a lessened scaling of the superheat units, less scoring of pistons and cylinders and reduced losses through packing blow-outs.

While any suitable arrangement may be provided for fastening the coalescing plates in the boiler, an arrangement which has proved satisfactory in practice is illustrated in Figure 6. Brackets 21 are fastened to the walls of the boiler in any suitable manner, such as by welding, and support angle irons 22 which bridge the space in the boiler between co-acting brackets 21. One of the angle irons 22 has a slotted opening, as indicated at 23 in Figure 10, and the angle iron is held on the bracket 21 through the provision of suitable bolts and nuts 24. The opening 23 provides an expansion joint permitting limited lengthwise movement of angle iron 22 under the temperature variations to which it is subjected. On the opposite wall, the arrangement may be repeated, or, if preferred, the opening 23 will permit a close fit with the bolt 24, or, if preferred, a fixed fastening may be provided by riveting.

At the ends of the assembly of plates 18, it is preferable to have depending plate portions 25 to prevent movement of collected foam in a lengthwise direction past the series of plates 18. This feature has been illustrated at 25 in Figure 1 and also on a larger scale in Figure 8a.

As some foaming also occurs in the section of the boiler over the fire box 16, the same control may be employed in that region of the boiler. This arrangement has been illustrated in Figure 7, in which series of nozzles 20 is located within the liquid body and below its surface 19 at intervals laterally of fire box 16. The functioning of these nozzles corresponds with that previously described.

While the various forms of devices described and illustrated herein show the possibilities for structural modifications within the spirit and scope of the invention, it will be apparent from the description that all of such devices are essentially the same in function and require an energy-dissipating treatment of the rising bubbles connected in the nozzles and a coalescent action followed by the discharge of this matter into the upper portion of the boiler liquid where it is free to travel uninterruptedly to the surface. The coalescence produces a condition favoring breaking of the bubbles at the surface, and as a result, foam formation is retarded to a degree sufficient to remove substantially all of the deleterious effects thereof previously encountered in boilers and the like.

While the invention has been described with particular reference to its use in locomotive boilers, it is effective also in other types of treatments requiring a foam-retarding action. Examples which may be cited are the evaporators of sugar refineries, the concentration and evaporation of food products, certain froth flotation treatments, and evaporation in ore dressing treatments.

In order to employ a generic term in describing the structural forms illustrated in Figures 3 and 5, the expression "compound cone" will be used in the description and claims. Where such definition is employed, it will be understood to apply to a succession of conical surfaces assembled or functioning as a unit, whether positioned similarly as in Figure 5, or differentially as in Figure 3.

Changes and modifications may be availed of within the spirit and scope of the invention as defined in the hereunto appended claims.

What I claim and desire to secure by Letters Patent is:

1. In apparatus for retarding foam and froth formation in boilers and pressure vessels, inclusive of a container for a body of liquid subject to evaporating influences and having foam producing bubbles rising therethrough, the improvement which comprises a partitioning member supported within the liquid body in a substantially horizontal position, said partitioning member having a plurality of vertically directed passages formed therein to permit escape of vapors or bubbles formed by said evaporating action, said passages having a lower intake opening of a size to admit a plurality of bubbles concurrently and in spaced relation, and having an upper discharge outlet restricted sufficiently to induce coalescing and engagement of a plurality of bubbles admitted simultaneously to the passage.

2. In apparatus for retarding foam and froth formation in boilers and pressure vessels, inclusive of a container for a body of liquid subject to evaporating influences and having foam producing bubbles rising therethrough, the improvement which comprises a partitioning member supported within the liquid body in a substantially horizontal position, said partitioning member having a plurality of vertically directed conical passages formed therein to permit escape of vapors or bubbles formed by said evaporating action, said passages having a lower intake opening of a size to admit a plurality of bubbles concurrently and in spaced relation and having an upper discharge outlet restricted sufficiently to induce coalescing engagement of a plurality of bubbles admitted simultaneously to the passage.

3. In apparatus for retarding foam and froth formation in boilers and pressure vessels, inclusive of a container for a body of liquid subject to evaporating influences and having foam producing bubbles rising therethrough, the improvement which comprises a partitioning member of substantially the same composition as the container supported within the liquid body in a substantially horizontal position, said partitioning member having a plurality of vertically directed pasages formed therein to permit escape of vapors or bubbles formed by said evaporating action, said passages having a lower intake opening of a size to admit a plurality of bubbles concurrently and in spaced relation and having an upper discharge outlet restricted sufficiently to induce coalescing engagement of a plurality of bubbles admitted simultaneously to the passage.

4. In apparatus for retarding foam and froth formation in boilers and pressure vessels, inclusive of a container for a body of liquid subject to evaporating influences and having foam producing bubbles rising therethrough, the improvement which comprises a partitioning member supported within the liquid body in a substantially horizontal position, said partitioning member having a plurality of vertically directed passages formed therein by members of organic composition to permit escape of vapors or bubbles formed by said evaporating action, said passages having a lower intake opening of a size to admit a plurality of bubbles concurrently and in spaced relation, and having an upper discharge outlet restricted sufficiently to induce coalescing engagement of a plurality of bubbles admitted simultaneously to the passage.

5. In apparatus for retarding foam and froth formation in boilers and pressure vessels, inclusive of a container for a body of liquid subject to evaporating influences and having foam producing bubbles rising therethrough, the improvement which comprises a partitioning member supported within the liquid body in a substantially horizontal position, said partitioning member having a plurality of vertically directed passages formed therein to permit escape of vapors or bubbles formed by said evaporating action, said passages having a lower intake opening of a size to admit a plurality of bubbles concurrently and in spaced relation, and having an upper flexible discharge outlet restricted sufficiently to induce coalescing engagement of a plurality of bubbles admitted simultaneously to the passage.

6. In a liquid body having foam formed on its surface by the action of bubbles continuously forming in said body by an evaporating action and thereafter rise to its surface, the improvement which comprises retarding foam formation at the surface by causing the bubbles after formation in fine sizes to travel through confined zones within the liquid body, subjecting a plurality of such bubbles concurrently passing through such a zone to energy-imparting influences while forcing their conjoint movement into coalescing engagement during discharge from said zone, moving the larger size bubbles resulting from the coalescent action directly through the liquid body to the surface, and subjecting such bubbles on reaching the surface to pressure changes inducing rupture of the film surface of the bubbles.

7. In a liquid body having foam formed on its surface by the action of bubbles continuously forming in said body by an evaporating action and thereafter rise to its surface, the improvement which comprises retarding foam formation at the surface by causing the bubbles after formation in fine sizes to travel through confined zones within the liquid body, subjecting a plurality of such bubbles concurrently passing through such a zone of progressively reduced volume to energy-imparting influences while forcing their conjoint movement into coalescing engagement during discharge from said zone, moving the larger size bubbles resulting from the coalescent action directly through the liquid body to the surface, and subjecting such bubbles on reaching the surface to pressure changes inducing rupture of the film surface of the bubbles.

WALTER B. LEAF.